(12) United States Patent
Lee et al.

(10) Patent No.: US 12,443,240 B2
(45) Date of Patent: Oct. 14, 2025

(54) ELECTRONIC DEVICE COMPRISING SENSOR PANEL

(71) Applicant: Samsung Electronics Co., Ltd., Suwon-si (KR)

(72) Inventors: Kyungho Lee, Suwon-si (KR); Youngsun Lee, Suwon-si (KR); Jiwon Kim, Suwon-si (KR); Kwanghee Ryu, Suwon-si (KR); Jungchul An, Suwon-si (KR); Chulhyo Yoon, Suwon-si (KR); Seungki Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/937,655

(22) Filed: Nov. 5, 2024

(65) Prior Publication Data
US 2025/0060787 A1 Feb. 20, 2025

Related U.S. Application Data

(63) Continuation of application No. PCT/KR2023/006025, filed on May 3, 2023.

(30) Foreign Application Priority Data

May 27, 2022 (KR) .................. 10-2022-0065249
Aug. 9, 2022 (KR) .................. 10-2022-0099192

(51) Int. Cl.
*G06F 1/16* (2006.01)
*G06F 3/0354* (2013.01)
(Continued)

(52) U.S. Cl.
CPC ........ *G06F 1/1652* (2013.01); *G06F 3/03545* (2013.01); *G06F 3/0412* (2013.01); *H04M 1/0268* (2013.01)

(58) Field of Classification Search
CPC .......... G06F 1/16; G06F 3/046; G06F 1/1652; G06F 3/03545; G06F 1/1643; G06F 3/0354; G06F 3/041; G06F 3/0412; H04M 1/0268
See application file for complete search history.

(56) References Cited

U.S. PATENT DOCUMENTS 9,870,072 B2    1/2018   Lee et al.
10,234,996 B2   3/2019   Barel
(Continued)

FOREIGN PATENT DOCUMENTS

KR    20200132150 A    11/2020
KR    20210087280 A     7/2021
(Continued)

OTHER PUBLICATIONS

International Search Report for PCT/KR2023/006025 mailed Aug. 1, 2023, 4 pages.

*Primary Examiner* — Yaron Cohen
(74) *Attorney, Agent, or Firm* — Nixon & Vanderhye P.C.

(57) ABSTRACT

An electronic device may include: a first housing; a second housing; a hinge structure; a display; and a sensor panel, wherein the sensor panel comprises: a support layer which comprises a polymer inclusive material and is in contact with an adhesive material arranged on at least one of a first surface of the first housing and a third surface of the second housing; a shielding layer arranged on the support layer; a first insulating layer arranged on the shielding layer; a first conductive pattern arranged on the first insulating layer; a second insulating layer arranged on the first conductive pattern; a second conductive pattern arranged on the second insulating layer; and a third insulating layer arranged on the second conductive pattern and facing one surface of the display, wherein the thickness of at least one of the first
(Continued)

insulating layer and the third insulating layer is greater than the thickness of the second insulating layer.

20 Claims, 8 Drawing Sheets

(51) Int. Cl.
*G06F 3/041* (2006.01)
*H04M 1/02* (2006.01)

(56) References Cited

U.S. PATENT DOCUMENTS

| | | |
|---|---|---|
| 10,474,266 B2 | 11/2019 | Chae et al. |
| 11,625,068 B2 | 4/2023 | Hwang et al. |
| 11,669,179 B2 | 6/2023 | Shin et al. |
| 2020/0257334 A1* | 8/2020 | Han .................... H04M 1/022 |
| 2022/0041821 A1 | 2/2022 | Park et al. |
| 2022/0064059 A1 | 3/2022 | Yun et al. |
| 2022/0066583 A1 | 3/2022 | Kishimoto et al. |
| 2022/0075413 A1 | 3/2022 | Park et al. |

FOREIGN PATENT DOCUMENTS

| | | |
|---|---|---|
| KR | 20210150942 A | 12/2021 |
| KR | 20210157946 A | 12/2021 |
| KR | 20220043668 A | 4/2022 |

\* cited by examiner

ELECTRONIC DEVICE COMPRISING SENSOR PANEL

CROSS-REFERENCE TO RELATED APPLICATIONS

This application is a continuation application of International Application No. PCT/KR2023/006025 filed on May 3, 2023, designating the United States, and claiming priority to Korean Patent Application No. 10-2022-0065249, filed on May 27, 2022, and Korean Patent Application No. 10-2022-0099192, filed on Aug. 9, 2022, in the Korean Intellectual Property Office, the disclosures of which are all hereby incorporated by reference herein in their entireties.

BACKGROUND

Technical Field

Certain example embodiments relate to an electronic device comprising a sensor panel.

Description of Related Art

An electronic device may include one or more electronic components to provide various functions to a user. The electronic device may include one or more electronic components that receive an input from a user and provide a specified function based on the received input. For example, the electronic device may include an electronic component capable of receiving an input through a portion of a body of the user or an external electronic device.

SUMMARY

An electronic device may include a sensor panel for receiving an input through an electronic pen. The electronic device may identify a touch input or a hovering input through the electronic pen via the sensor panel. The sensor panel may be damaged by an impact generated as a user carries the electronic device. The electronic device may need a structure for preventing or reducing chances of damage to the sensor panel.

The technical problems to be achieved in this document are not limited to those described above, and other technical problems not mentioned herein will be clearly understood by those having ordinary knowledge in the art to which the present disclosure belongs, from the following description.

According to an example embodiment, an electronic device may comprise a first housing which may include a first surface and a second surface opposite to the first surface and a second housing which may include a third surface and a fourth surface opposite to the third surface. According to an example embodiment, the electronic device may comprise a hinge structure, comprising a hinge, configured to be switched between an unfolding state in which a direction in which the first surface faces and a direction in which the third surface faces are the same, and a folding state in which the first surface and the third surface face each other, by rotatably coupling the first housing and the second housing. According to an example embodiment, the electronic device may comprise a display disposed above the first surface and the third surface across the hinge structure and a sensor panel, disposed between, directly or indirectly, at least one of the first surface and the third surface and the display, and configured to receive an input from an electronic pen. According to an example embodiment, the sensor panel may include a supporting layer, which may include a polymer inclusive material, and being in contact with an adhesive material disposed on at least one of the first surface and the third surface. According to an example embodiment, the sensor panel may include a shielding layer disposed on the supporting layer, a first insulating layer disposed on the shielding layer, a first conductive pattern disposed on the first insulating layer, a second insulating layer disposed on the first conductive layer, a second conductive pattern disposed on the second insulating layer, and a third insulating layer, disposed on the second conductive pattern, and facing a surface of the display. According to an example embodiment, a thickness of at least one of the first insulating layer and the third insulating layer may be greater than a thickness of the second insulating layer.

According to an example embodiment, an electronic device may comprise a first housing which may include a first surface and a second surface opposite to the first surface and a second housing which may include a third surface and a fourth surface opposite to the third surface. According to an example embodiment, the electronic device may comprise a hinge structure capable of being switched to an unfolding state in which a direction in which the first surface faces and a direction in which the third surface faces are the same, or a folding state in which the first surface and the third surface face each other, by coupling a side of the first housing and a side of the second housing. According to an example embodiment, the electronic device may comprise a display disposed above the first surface and the third surface across the hinge structure. According to an example embodiment, the electronic device may comprise a sensor panel that includes a first region disposed between the first surface and the display and a second region disposed between the third surface and the display, and spaced from the first region, and is configured to receive an input from an electronic pen. According to an example embodiment, the sensor panel may include a supporting layer, which may include a polymer inclusive material, and being in contact with an adhesive material disposed on at least one of the first surface and the third surface. According to an example embodiment, the sensor panel may include a first shielding layer disposed on the supporting layer, a first insulating layer disposed on the shielding layer, a first conductive pattern disposed on the first insulating layer, a second insulating layer disposed on the first conductive layer, a second conductive pattern disposed on the second insulating layer, and a third insulating layer, disposed on the second conductive pattern, and facing a surface of the display. According to an example embodiment, a thickness of the first insulating layer and the third insulating layer may be greater than a thickness of the second insulating layer.

According to an example embodiment, an electronic device can provide a structure capable of smoothly obtaining an input from a user by a sensor panel which may include a structure robust to an impact applied from the outside of the electronic device.

The effects that can be obtained are not limited to those described above, and any other effects not mentioned herein will be clearly understood by those having ordinary knowledge in the art to which the present disclosure belongs, from the following description.

DETAILED DESCRIPTION

Figure 1:
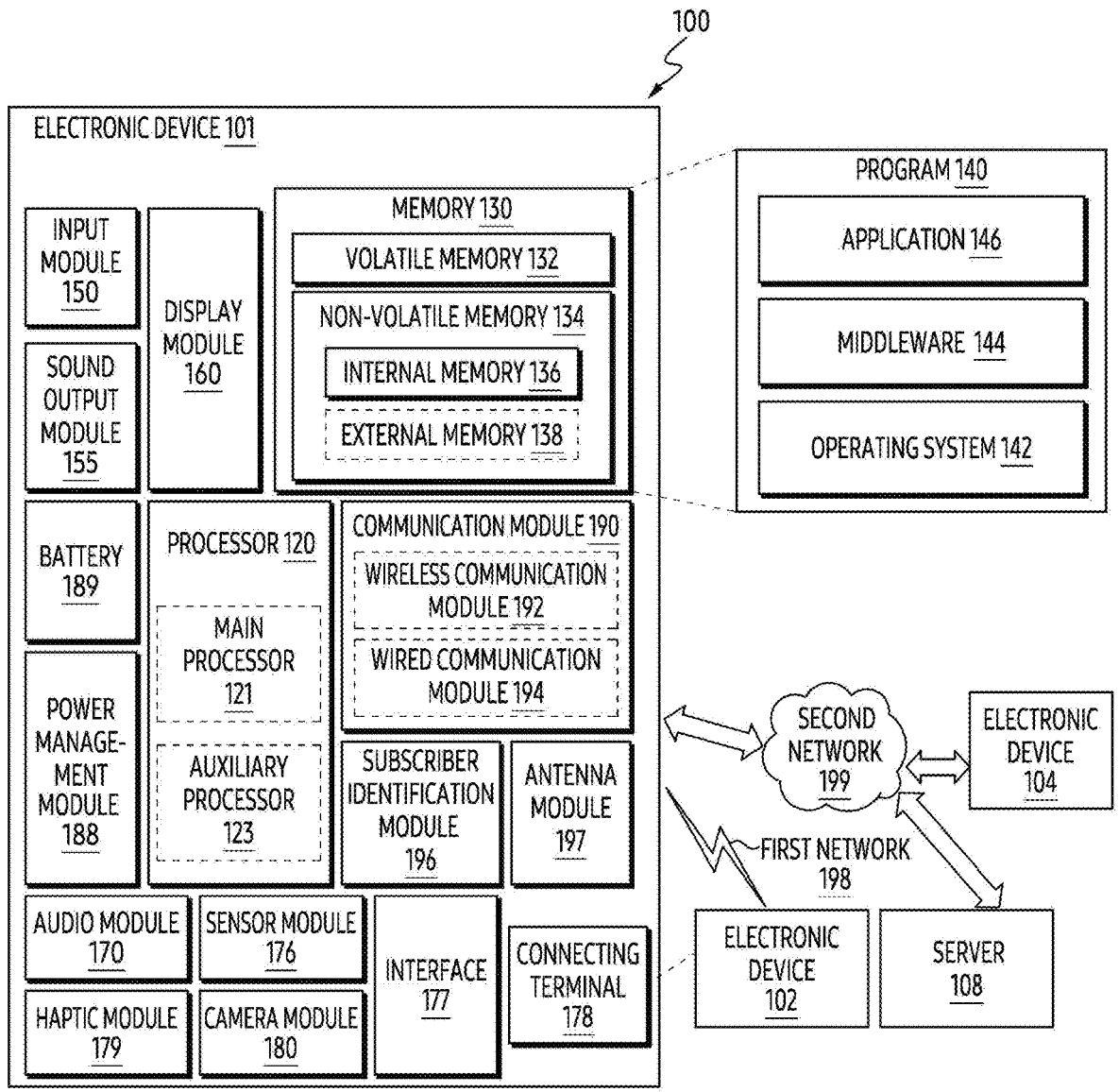
FIG. 1 is a block diagram of an electronic device in a network environment according to various example embodiments.

FIG. 1 is a block diagram illustrating an electronic device 101 in a network environment 100 according to various example embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module).

A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
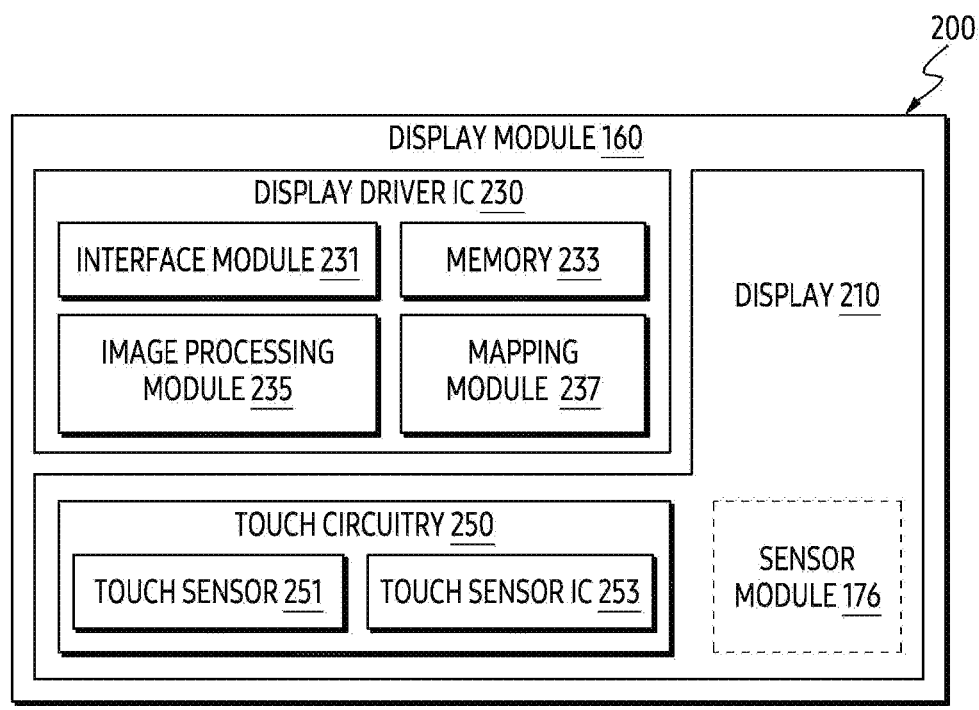
FIG. 2 is a block diagram of a display module according to various example embodiments.

FIG. 2 is a block diagram 200 illustrating the display module 160 according to various embodiments.

Referring to FIG. 2, the display module 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
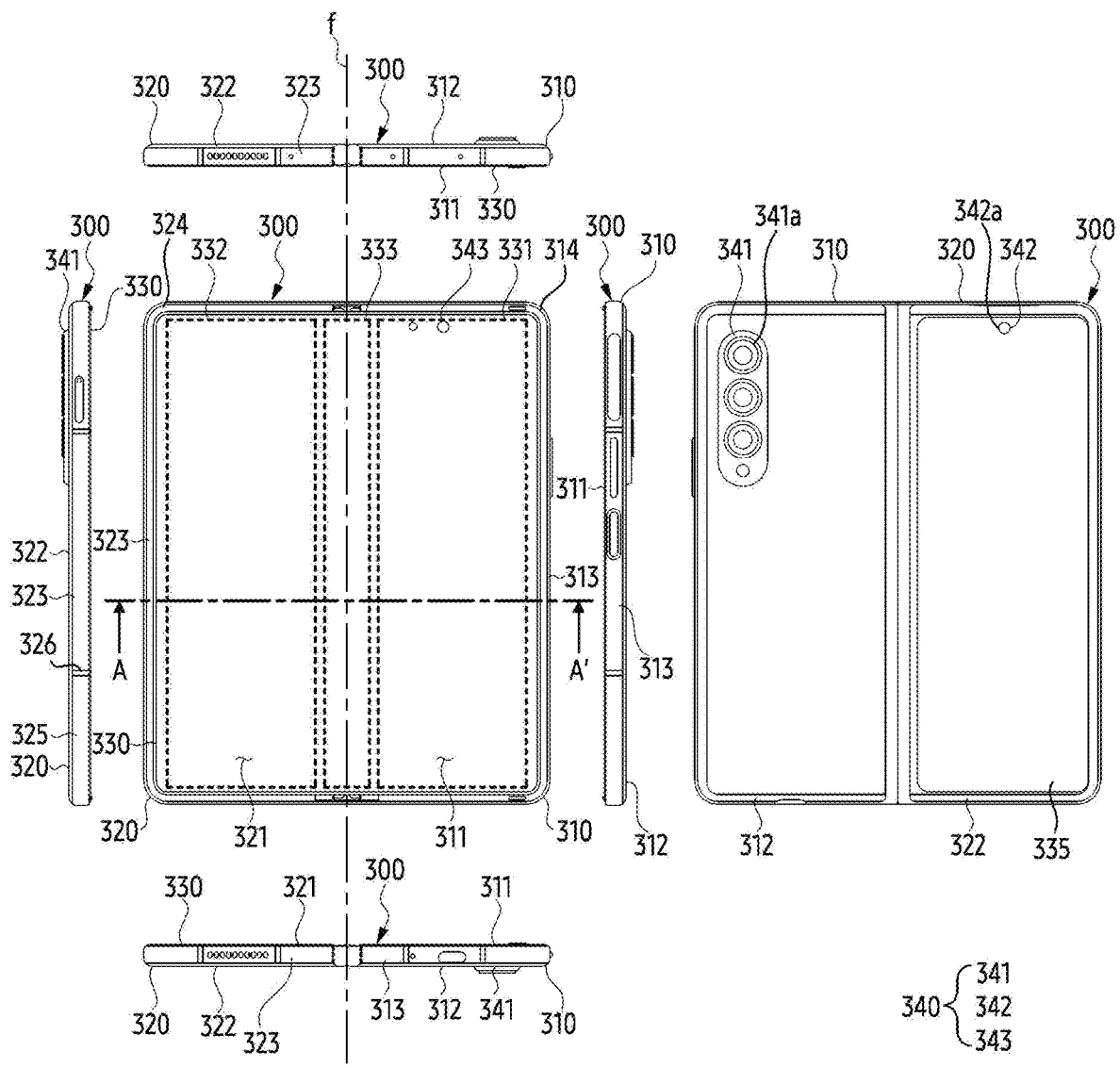
FIG. 3A illustrates an example of an unfolding state of an electronic device according to an example embodiment.
Figure 3B:
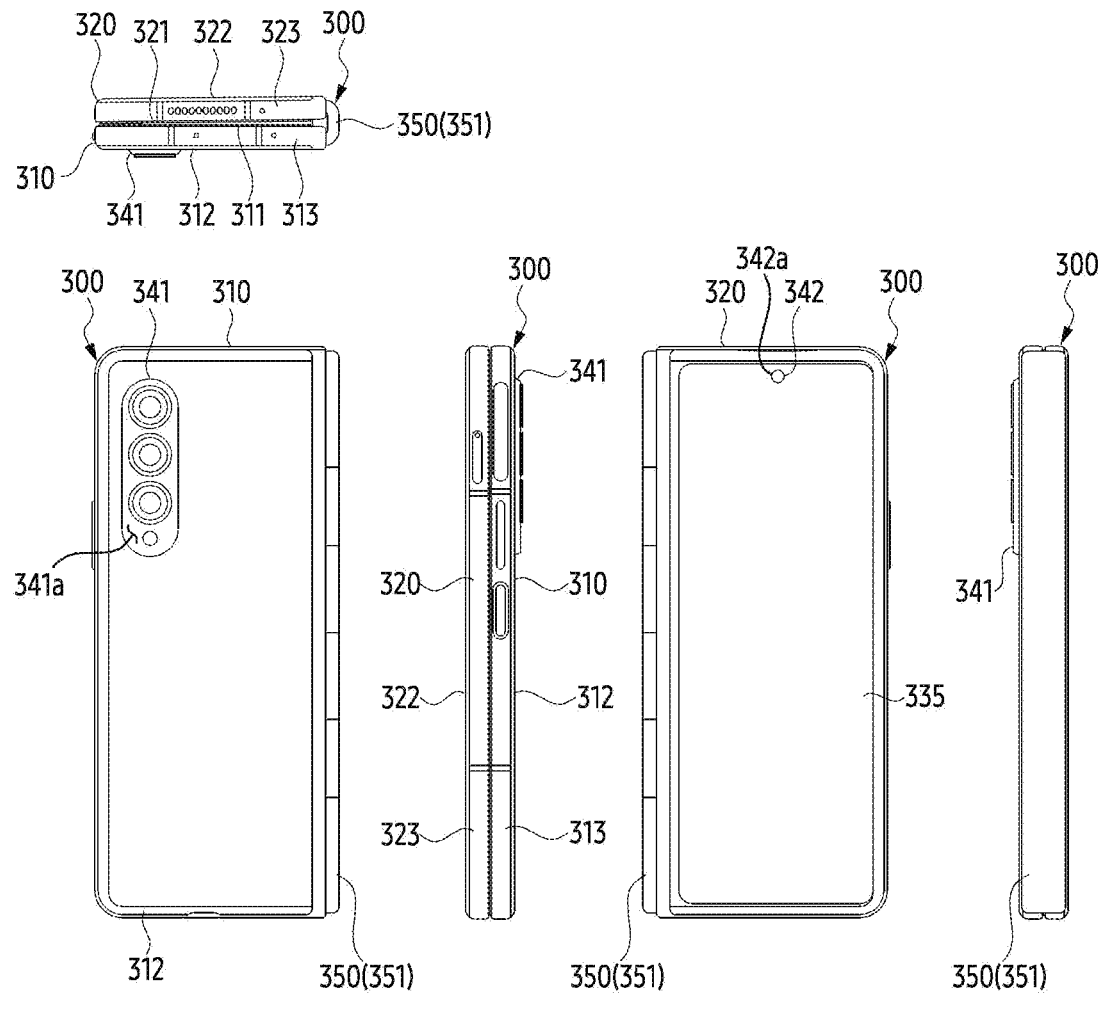
FIG. 3B illustrates an example of a folding state of an electronic device according to an example embodiment.
Figure 3B:
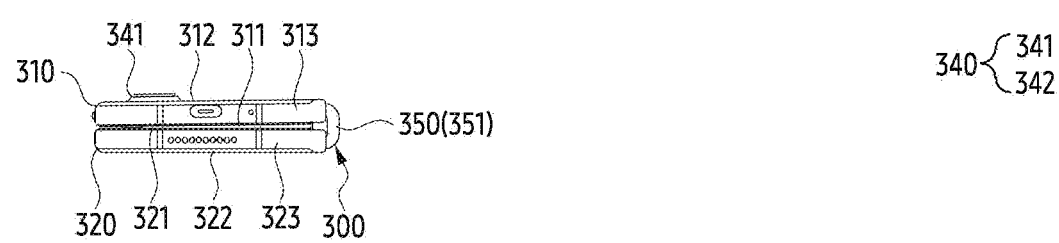
Figure 3B:
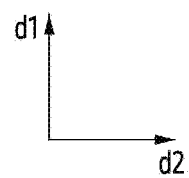
Figure 3C:
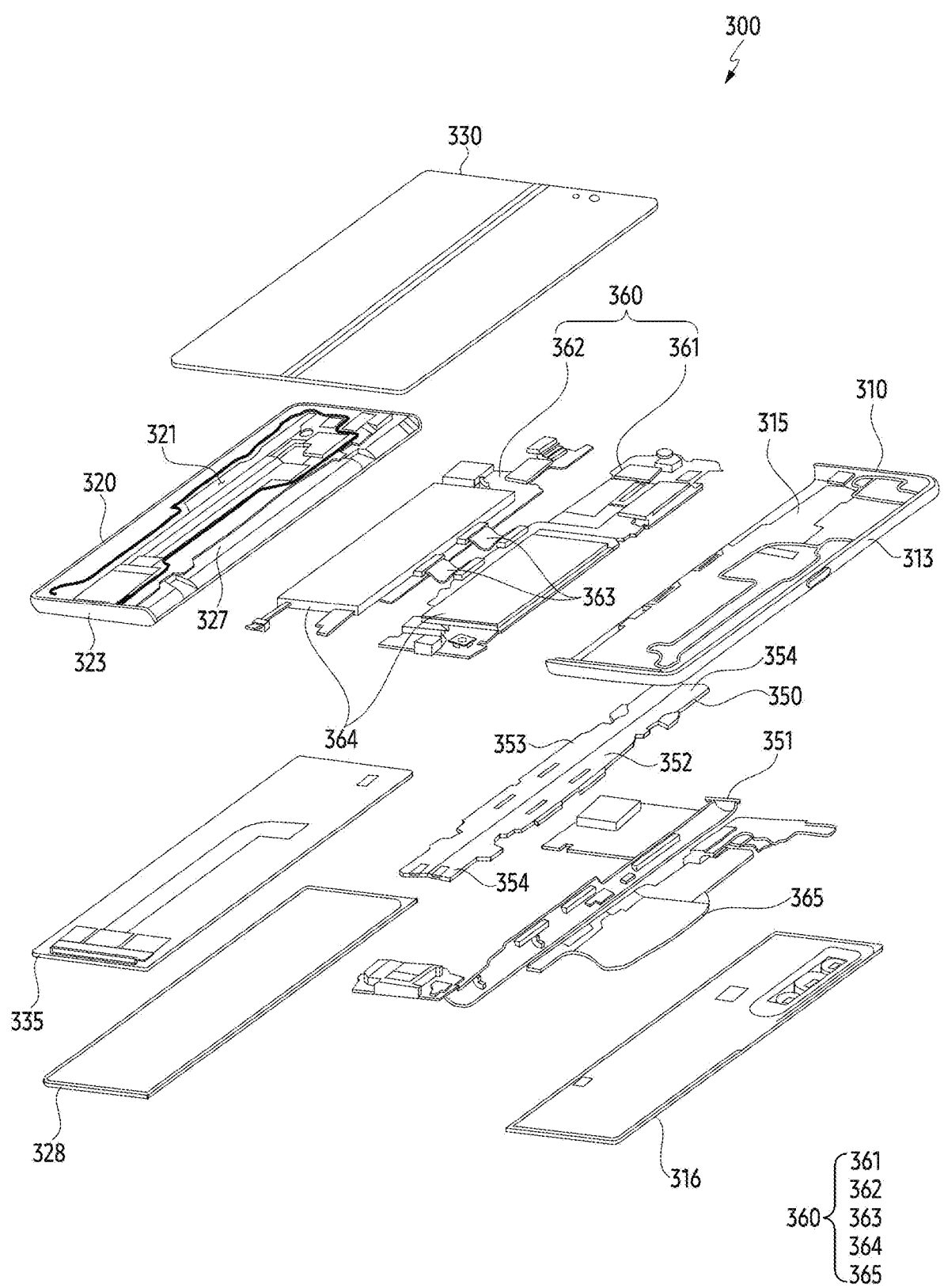
FIG. 3C is an exploded view of an electronic device according to an example embodiment.

FIG. 3A illustrates an example of an unfolding state of an electronic device according to an embodiment, FIG. 3B illustrates an example of a folding state of an electronic device according to an embodiment, and FIG. 3C is an exploded view of an electronic device according to an embodiment.

Referring to FIGS. 3A, 3B, and 3C, an electronic device 300 (e.g., the electronic device 101 of FIG. 1) may include a first housing 310, a second housing 320, a display 330 (e.g., the display module 160 of FIGS. 1 and 2), at least one camera 340, a hinge structure 350, and/or at least one electronic component 360.

The first housing 310 and the second housing 320 may form at least a portion of an outer surface of the electronic device 300 that may be gripped by a user. At least a portion of the outer surface of the electronic device 300 for example defined by the first housing 310 and the second housing 320 may contact a portion of a body of a user when the electronic device 300 is used by the user. According to an embodiment, the first housing 310 may include a first surface 311, a second surface 312 facing the first surface 311 and spaced apart from the first surface 311, and a first side 313 surrounding at least a portion of the first surface 311 and the second surface 312. The second surface 312 may mean a surface of the first housing 310 opposite to the first surface 311. The first side 313 may connect a periphery of the first surface 311 and a periphery of the second surface 312. The first surface 311, the second surface 312, and the first side 313 may define an inner space of the first housing 310. According to an embodiment, the first housing 310 may provide a space formed by the first surface 311, the second surface 312, and the first side 313 as a space for disposing components of the electronic device 300.

| According to an embodiment, the second housing 320 may include a third surface 321, a fourth surface 322 facing the third surface 321 and spaced apart from the third surface 321, and a second side 323 surrounding at least a portion of the third surface 321 and the fourth surface 322. The fourth surface 322 may mean a surface of the second housing 320 opposite to the third surface 321. The second side 323 may connect a periphery of the third surface 321 with a periphery of the fourth surface 322. The third surface 321, the fourth surface 322, and the second side 323 may define an inner space of the second housing 320. According to an embodiment, the second housing 320 may provide a space formed by the third surface 321, the fourth surface 322, and the second side 323 surrounding at least a portion of the third surface 321 and the fourth surface 322, as a space for mounting components of the electronic device 300. According to an embodiment, the second housing 320 may be rotatably coupled to the first housing 310.

According to an embodiment, each of the first housing 310 and the second housing 320 may include a first protective member 314 and a second protective member 324, respectively. The first protective member 314 and the second protective member 324 may be disposed on the first surface 311 and the third surface 321 along a periphery of the display 330. According to an embodiment, the first protective member 314 and the second protective member 324 may prevent an inflow of a foreign substance (e.g., dust or moisture) through a gap between the display 330 and the first housing 310 and the second housing 320 (e.g., between the display 330 and both the first and the second housing 310 and 320). For example, the first protective member 314 may surround a periphery of a first display region 331 of the display 330 and the second protective member 324 may surround a periphery of a second display region 332 of the display 330. The first protective member 314 may be formed by being attached to the first side 313 of the first housing 310 or may be formed integrally with the first side 313. The second protective member 324 may be formed by being attached to the second side 323 of the second housing 320 or may be formed integrally with the second side 323.

According to an embodiment, the first side 313 and the second side 323 may include a conductive material, a non-conductive material, or a combination thereof. For example, the second side 323 may include at least one conductive member 325 and at least one non-conductive member 326. The at least one conductive member 325 may include a plurality of conductive members spaced apart from each other. The at least one non-conductive member 326 may be disposed between, directly or indirectly, the plurality of conductive members. The plurality of conductive members may be disconnected from each other by the at least one non-conductive member 326 disposed between the plurality of conductive members. According to an embodiment, the plurality of conductive members and a plurality of non-conductive members may form an antenna radiator together. The electronic device 300 may be capable of communicating with an external electronic device through the antenna radiator formed by the plurality of conductive members and the plurality of non-conductive members.

The display 330 may be configured to display visual information. According to an embodiment, the display 330 may be disposed on the first surface 311 of the first housing 310 and the third surface 321 of the second housing 320 across the hinge structure 350. For example, the display 330 may include the first display region 331 disposed on the first surface 311 of the first housing 310, the second display region 332 disposed on the third surface 321 of the second housing, and a third display region 333 disposed between the first display region 331 and the second display region 332. The first display region 331, the second display region 332, and the third display region 333 may form a front surface of the display 330. According to an embodiment, the display 330 may further include a sub-display panel 335 disposed on the fourth surface 322 of the second housing 320. According to an embodiment, the display 330 may include a window exposed toward the outside of the electronic device 300. The window may protect a surface of the display 330, and include a substantially transparent material to transmit visual information provided by the display 330 to the outside of the electronic device 300. For example, the window may include glass (e.g., ultra-thin glass (UTG)) and/or a polymer (e.g., polymer (PI)), but it is not limited thereto.

At least one camera 340 may be configured to obtain an image based on receiving light from a subject outside of the electronic device 300. According to an embodiment, the at least one camera 340 may include first cameras 341, a second camera 342, and a third camera 343. The first cameras 341 may be disposed in the first housing 310. For example, the first cameras 341 may be disposed inside the first housing 310, and may be at least partially visible through the second surface 312 of the first housing 310. The first cameras 341 may be supported by a supporting member (e.g., a bracket) in the first housing 310. The first housing 310 may include at least one opening 341a overlapping the first cameras 341 when the second surface 312 is viewed from above. The first cameras 341 may obtain an image based on receiving light from the outside of the electronic device 300 through the at least one opening 341a.

According to an embodiment, the second camera 342 may be disposed in the second housing 320. For example, the second camera 342 may be disposed inside the second housing 320 and may be visible through the sub-display panel 335. The second housing 320 may include at least one opening 342a overlapping the second camera 342 when the fourth surface 322 is viewed from above. The second camera 342 may obtain an image based on receiving light from the outside of the electronic device 300 through the at least one opening 342a.

According to an embodiment, the third camera 343 may be disposed in the first housing 310. For example, the third camera 343 may be disposed inside the first housing 310, and may be at least partially visible through the first surface 311 of the first housing 310. For another example, the third camera 343 may be disposed inside the first housing 310, and may be at least partially visible through the first display region 331 of the display 330. The first display region 331 of the display 330 may include at least one opening overlapping the third camera 343 when the display 330 is viewed from above. The third camera 343 may obtain an image based on receiving light from the outside of the display 330 through at least one opening.

According to an embodiment, the second camera 342 and the third camera 343 may be disposed below the display 330 (e.g., in a direction toward the inside of the first housing 310 or the inside of the second housing 320). For example, the second camera 342 and the third camera 343 may be an under display camera (UDC). In case that the second camera 342 and the third camera 343 are the under display camera, a region of the display 330 corresponding to a position of each of the second camera 342 and the third camera 343 may not be an inactive region. In case that the second camera 342 and the third camera 343 are the under display camera, the region of the display 330 corresponding to the position of each of the second camera 342 and the third camera 343 may have a lower pixel density than a pixel density of another region of the display 330. The inactive region of the display 330 may mean a region of the display 330 that does not include a pixel or does not emit light outside the electronic device 300. For another example, the second camera 342 and the third camera 343 may be a punch hole camera. In case that the second camera 342 and the third camera 343 are the punch hole camera, a region of the display 330 corresponding to the position of each of the second camera 342 and the third camera 343 may be an inactive region. In case that the second camera 342 and the third camera 343 are the punch hole camera, the region of the display 330 corresponding to the position of each of the second camera 342 and the third camera 343 may include an opening that does not include a pixel.

According to an embodiment, the hinge structure 350 may rotatably couple the first housing 310 and the second housing 320. The hinge structure 350 may be disposed between, directly or indirectly, the first housing 310 and the second housing 320 of the electronic device 300 so that the electronic device 300 may be bent, curved, or folded. For example, the hinge structure 350 may be disposed between a portion of the first side 313 and a portion of the second side 323 facing each other. The hinge structure 350 may be capable of being switched to an unfolding state in which the first surface 311 of the first housing 310 and the third surface 321 of the second housing 320 face a same direction as each other, or a folding state in which the first surface 311 and the third surface 321 face each other. When the electronic device 300 is in the folding state, the first housing 310 and the second housing 320 may be overlapped or piled by facing each other.

According to an embodiment, when the electronic device 300 is in the folding state, a direction in which the first surface 311 faces and a direction in which the third surface 321 faces may be different from each other. For example, when the electronic device 300 is in the folding state, the direction in which the first surface 311 faces and the direction in which the third surface 321 faces may be opposite to each other. For another example, when the electronic device 300 is in the folding state, the direction in which the first surface 311 faces and the direction in which the third surface 321 faces may be inclined with respect to each other. In case that the direction in which the first surface 311 faces is inclined with respect to the direction in which the third surface 321 faces, the first housing 310 may be inclined with respect to the second housing 320.

According to an embodiment, the electronic device 300 may be foldable based on a folding axis f. The folding axis f may mean an imaginary line passing a hinge cover 351 and extending in a direction (e.g., d1 in FIGS. 3A and 3B) substantially parallel to a longitudinal direction of the electronic device 300, but it is not limited thereto. For example, the folding axis f may be an imaginary line extending in a direction (e.g., d2 in FIGS. 3A and 3B) substantially perpendicular to the longitudinal direction of the electronic device 300. In case that the folding axis f extends in the direction substantially perpendicular to the longitudinal direction of the electronic device 300, the hinge structure 350 may couple the first housing 310 and the second housing 320, by extending in the direction parallel to the folding axis f. The first housing 310 and the second housing 320 may be rotatable by the hinge structure 350 extending in the direction substantially perpendicular to the longitudinal direction of the electronic device 300.

According to an embodiment, the hinge structure 350 may include the hinge cover 351, a first hinge plate 352, a second hinge plate 353, and a hinge module 354. The hinge cover 351 may surround internal components of the hinge structure 350 and may form an outer surface of the hinge structure 350. According to an embodiment, when the electronic device 300 is in the folding state, the hinge cover 351 surrounding the hinge structure 350 may be at least partially exposed to the outside of the electronic device 300 through a gap between the first housing 310 and the second housing 320. According to another embodiment, when the electronic device 300 is in an unfolding state, the hinge cover 351 may be covered by the first housing 310 and the second housing 320 and may not be exposed to the outside of the electronic device 300.

According to an embodiment, the first hinge plate 352 and the second hinge plate 353 may be rotatably coupled the first housing 310 and the second housing 320, by being coupled to the first housing 310 and the second housing 320, respectively. For example, the first hinge plate 352 may be coupled with a first front bracket 315 of the first housing 310, and the second hinge plate 353 may be coupled with a second front bracket 327 of the second housing 320. Since the first hinge plate 352 and the second hinge plate 353 are coupled to the first front bracket 315 and the second front bracket 327, respectively, the first housing 310 and the second housing 320 may be rotatable according to the rotation of the first hinge plate 352 and the second hinge plate 353.

The hinge module 354 may rotate the first hinge plate 352 and the second hinge plate 353. For example, the hinge module 354 may rotate the first hinge plate 352 and the second hinge plate 353 based on the folding axis f, by including gears, which may be engaged with each other and are rotate. According to an embodiment, the hinge modules 354 may be a plural. For example, a plurality of hinge modules 354 may be disposed to be spaced apart from each other at both ends of the first hinge plate 352 and the second hinge plate 353, respectively.

According to an embodiment, the first housing 310 may include the first front bracket 315 and a first rear bracket 316, and the second housing 320 may include the second front bracket 327 and a second rear bracket 328. The first front bracket 315 and the first rear bracket 316 may support components of the electronic device 300. The first front bracket 315 may define the first housing 310, by being coupled to the first rear bracket 316. The first rear bracket 316 may define a portion of an outer surface of the first housing 310. The second front bracket 327 and the second rear bracket 328 may support components of the electronic device 300. The second front bracket 327 may define the second housing 320, by being coupled to the second rear bracket 328. The second rear bracket 328 may define a portion of an outer surface of the second housing 320. For example, the display 330 may be disposed on a surface of the first front bracket 315 and a surface of the second front bracket 327. The first rear bracket 316 may be disposed on another surface of the first front bracket 315 opposite to the surface of the first front bracket 315. The second rear bracket 328 may be disposed on another surface of the second front bracket 327 opposite to the surface of the second front bracket 327. The sub-display panel 335 may be disposed between, directly or indirectly, the second front bracket 327 and the second rear bracket 328.

According to an embodiment, a portion of the first front bracket 315 may be surrounded by the first side 313, and a portion of the second front bracket 327 may be surrounded by the second side 323. For example, the first front bracket 315 may be integrally formed with the first side 313, and the second front bracket 327 may be integrally formed with the second side 323. For another example, the first front bracket 315 may be formed separately from the first side 313, and the second front bracket 327 may be formed separately from the second side 323.

At least one electronic component 360 may implement various functions to be provided to a user. According to an embodiment, at least one electronic component 360 may include a first printed circuit board 361, a second printed circuit board 362, a flexible printed circuit board 363, a battery 364, and/or an antenna 365. The first printed circuit board 361 and the second printed circuit board 362 may form an electrical connection between components within the electronic device 300, respectively. For example, components (e.g., the processor 120 of FIG. 1) for implementing an overall function of the electronic device 300 may be disposed in the first printed circuit board 361, and electronic components for implementing a partial function of the first printed circuit board 361 may be disposed in the second printed circuit board 362. For another example, components for an operation of the sub-display panel 335 disposed on the fourth surface 322 may be disposed in the second printed circuit board 362.

According to an embodiment, the first printed circuit board 361 may be disposed in the first housing 310. For example, the first printed circuit board 361 may be disposed on a surface of the first front bracket 315. According to an embodiment, the second printed circuit board 362 may be disposed in the second housing 320. For example, the second printed circuit board 362 may be spaced apart from the first printed circuit board 361 and disposed on a surface of the second front bracket 327. The flexible printed circuit board 363 may connect the first printed circuit board 361 and the second printed circuit board 362. For example, the flexible printed circuit board 363 may extend from the first printed circuit board 361 to the second printed circuit board 362.

The battery 364 may be a device for supplying power to at least one component of the electronic device 300, and may include, for example, a non-rechargeable primary battery, a rechargeable secondary battery, or a fuel cell. At least a portion of the battery 364 may be disposed substantially on a same plane as the first printed circuit board 361 or the second printed circuit board 362.

The antenna 365 may be configured to receive power or a signal from the outside of the electronic device 300. According to an embodiment, the antenna 365 may be disposed between, directly or indirectly, the first rear bracket 316 and the battery 364. The antenna 365 may include, for example, a near field communication (NFC) antenna, a wireless charging antenna, and/or a magnetic secure transmission (MST) antenna. The antenna 365 may, for example, perform short-range communication with an external device or wirelessly transmit and receive power required for charging.

Figure 4A:
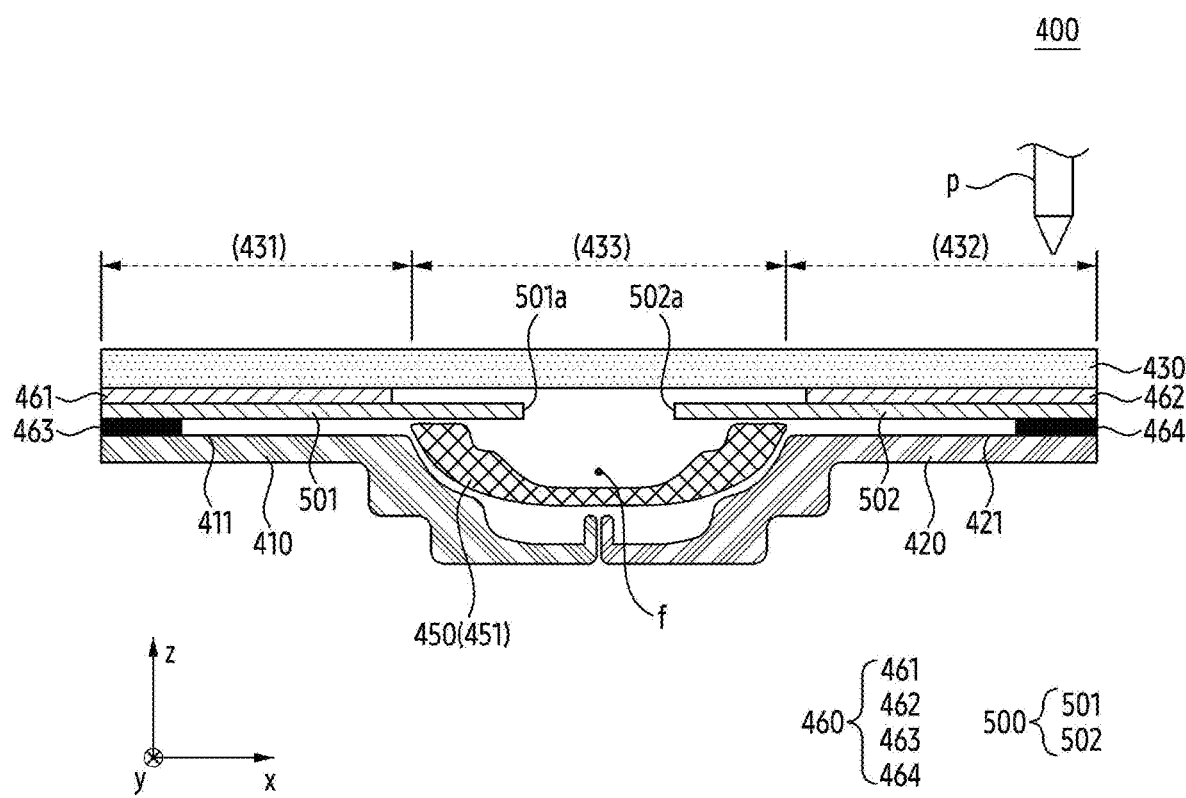
FIG. 4A is a cross-sectional view illustrating an example of an electronic device according to an example embodiment, cut along line A-A' of FIG. 3A.
Figure 4B:
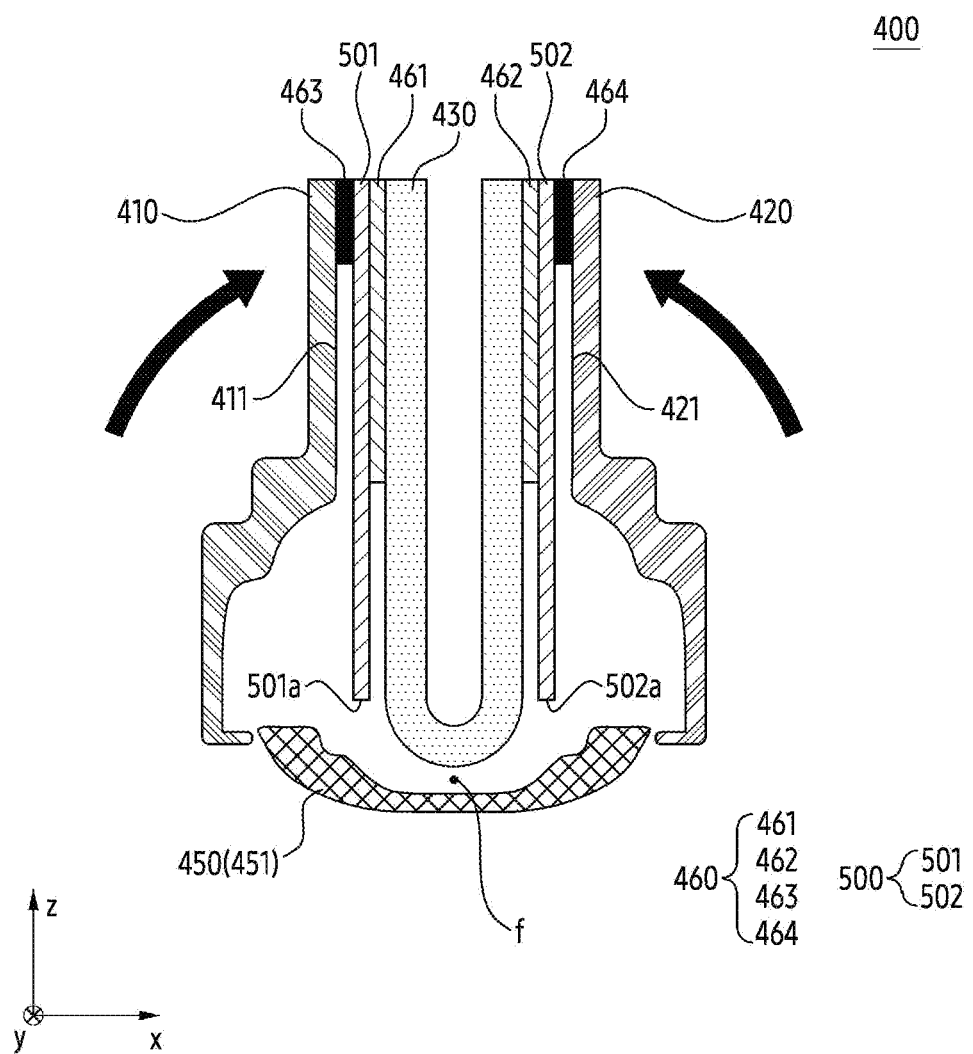
FIG. 4B is a cross-sectional view illustrating an example of a folding state of an electronic device of FIG. 4A according to an example embodiment.

FIG. 4A is a cross-sectional view illustrating an example of an electronic device according to an embodiment, cut along line A-A' of FIG. 3A, and FIG. 4B is a cross-sectional view illustrating an example of a folding state of an electronic device of FIG. 4A according to an embodiment.

Referring to FIGS. 4A and 4B, an electronic device 400 (e.g., the electronic device 300 of FIGS. 3A, 3B and/or 3C) according to an embodiment may include a first housing 410, a second housing 420, a display 430, a hinge structure 450, at least one adhesive member 460, and/or a sensor panel 500. The first housing 410, the second housing 420, the display 430, and the hinge structure 450 of FIGS. 4A and 4B may be substantially the same as the first housing 310, the second housing 320, the display 330, and the hinge structure 350 of FIGS. 3A, 3B, and 3C, respectively, and thus a redundant description thereof will be omitted.

| According to an embodiment, the second housing 420 may be movably coupled to the first housing 410. For example, the second housing 420 may be rotatable with respect to the first housing 410 by the hinge structure 450. The electronic device 400 may be switched to a folding state or an unfolding state, by movement of the second housing 420 with respect to the first housing 410. According to an embodiment, when the electronic device 400 is in the folding state, a direction in which a first surface 411 (e.g., the first surface 311 of FIG. 3A) of the first housing 410 faces and a direction in which a third surface 421 (e.g., the second surface 321 of FIG. 3A) of the second housing 420 faces may be different from each other. For example, when the electronic device 400 is in the folding state, the first surface 411 and the third surface 421 may face each other. According to an embodiment, when the electronic device 400 is in the unfolding state, the direction in which the first surface 411 of the first housing 410 faces and the direction in which the third surface 421 of the second housing 420 faces may be substantially the same. For example, when the electronic device 400 is in the unfolding state, the first surface 411 and the third surface 421 may be parallel to each other.

According to an embodiment, the display 430 may be disposed on the first housing 410 and the second housing 420. For example, the display 430 may be disposed above the first surface 411 of the first housing 410 and the third surface 421 of the second housing 420. According to an embodiment, the display 430 may be disposed above the hinge structure 450. For example, the display 430 may cross the hinge structure 450, by extending from the first housing 410 in a direction (e.g., −x direction or +x direction) substantially perpendicular to a folding axis f (e.g., the folding axis f of FIG. 3A). The display 430 may extend from the first housing 410 across the hinge structure 450 to the second housing 420. The display 430 may be integrally formed on the first housing 410, the hinge structure 450, and the second housing 420. According to an embodiment, the display 430 may be referred to as a flexible display.

According to an embodiment, the display 430 may include a plurality of layers stacked in order. For example, the plurality of layers may include a light emitting layer including a thin film transistor (TFT) and a plurality of pixels controlled by the TFT. The plurality of pixels included in the light emitting layer may emit light toward a surface of the display 430 based on a current or voltage supplied from the TFT. According to an embodiment, the display 430 may be electrically connected, directly or indirectly, to a display driving integrated circuit (DDI) (e.g., the display driving circuit 230 of FIG. 2) that controls an operation of the plurality of layers.

According to an embodiment, the display 430 may include a first display region 431, a second display region 432, and a third display region 433. The first display region 431 may be disposed on the first surface 411 of the first housing 410. The second display region 432 may be disposed on the third surface 421 of the second housing 420. The third display region 433 may be disposed between the first display region 431 and the second display region 432. The third display region 433 may at least partially overlap the hinge structure 450 when the display 430 is viewed from above (e.g., +z direction). According to an embodiment, the display 430 may be deformable by movement of the second housing 420 with respect to the first housing 410. As the electronic device 400 is switched from the unfolding state to the folding state, the display 430 may have a curvature by being bent. For example, when the electronic device 400 is in the folding state, a portion of the first display region 431 may face a portion of the second display region 432. For another example, when the electronic device 400 is in the folding state, at least a portion of the third display region 433 may have a curvature by being bent.

Although not illustrated in FIGS. 4A and 4B, the electronic device 400 may further include a reinforcing member (not illustrated) disposed between the display 430 and the sensor panel 500. The reinforcing member may support the display 430 that is deformed according to movement of the second housing 420. The reinforcing member may be deformable according to movement of the second housing 420. For example, the reinforcing member may include a plurality of slits disposed at a position corresponding to the hinge structure 450. For example, the reinforcing member may include a carbon fiber reinforced plastic (CFRP), but it is not limited thereto.

According to an embodiment, the hinge structure 450 may rotatably couple the first housing 410 and the second housing 420 so that the display 430 may be bent or folded. For example, the hinge structure 450 may include gears (not illustrated), which may be engaged with each other and are rotate. The hinge structure 450 may rotate the second housing 420 with respect to the first housing 410 by rotation of the gears engaged with each other. According to an embodiment, the hinge structure 450 may include a hinge cover 451 (e.g., the hinge cover 351 of FIG. 3A, FIG. 3B, and FIG. 3C). The hinge cover 451 may protect components of the hinge structure 450 disposed inside the hinge structure 450. According to an embodiment, when the electronic device 400 is in the folding state, the hinge structure 450 may be exposed to the outside of the electronic device 400. When the electronic device 400 is in the unfolding state, the hinge structure 450 may be covered by a portion of the first housing 410 and a portion of the second housing 420.

At least one adhesive member 460 may maintain a coupling between components of the electronic device 400. The adhesive member 460 may include an adhesive material, and may be interposed between, directly or indirectly, a component of the electronic device 400 and another component. According to an embodiment, at least one adhesive member 460 may include a first adhesive member 461, a second adhesive member 462, a third adhesive member 463, and/or a fourth adhesive member 464. The first adhesive member 461 and the second adhesive member 462 may be disposed between the display 430 and the sensor panel 500. According to an embodiment, the first adhesive member 461 may be in contact with a portion of the sensor panel 500 disposed in the first housing 410. The second adhesive member 462 may be in contact with another portion of the sensor panel 500 disposed in the second housing 420. For example, the first adhesive member 461 and the second adhesive member 462 may include a pressure sensitive adhesive (PSA), respectively, but it is not limited thereto.

According to an embodiment, the third adhesive member 463 may be disposed between, directly or indirectly, the first housing 410 and the sensor panel 500. For example, the third adhesive member 463 may be disposed on the first surface 411 of the first housing 410 facing the sensor panel 500. The third adhesive member 463 may attach a portion of the sensor panel 500 disposed in the first housing 410 to the first housing 410. According to an embodiment, the fourth adhesive member 464 may be disposed between, directly or indirectly, the second housing 420 and the sensor panel 500. For example, the fourth adhesive member 464 may be disposed on the third surface 421 of the second housing 420 facing the sensor panel 500. The fourth adhesive member 464 may attach another portion of the sensor panel 500 disposed in the second housing 420 to the second housing 420.

According to an embodiment, the third adhesive member 463 and the fourth adhesive member 464 may block an inflow of moisture into the first housing 410 or the second housing 420. For example, the third adhesive member 463 and the fourth adhesive member 464 may be referred to as a waterproof member that blocks the inflow of moisture into the first housing 410 or the second housing 420. For another example, the third adhesive member 463 and the fourth adhesive member 464 may be referred to as an absorption member that absorbs moisture within the first housing 410 or the second housing 420.

The sensor panel 500 may be configured to receive an input from an electronic pen p. The sensor panel 500 may be configured to receive a hovering input or a touch input on the display 430. According to an embodiment, the sensor panel 500 may be referred to as an electromagnetic resonance (EMR) panel, an electromagnetic induction panel, and/or a digitizer. According to an embodiment, the electronic pen p may be referred to as a stylus pen. For example, the electronic pen p may have substantially a same shape as a shape of a pen. According to an embodiment, the electronic pen p may be detachably coupled within the electronic device 400. For example, the electronic device 400 may include an accommodation space for accommodating the electronic pen p, and the electronic pen p may be inserted into the accommodation space. However, it is not limited thereto, and the electronic pen p may not be accommodated within the electronic device 400. According to an embodiment, the electronic pen p may be attached to an outer surface of the electronic device 400.

According to an embodiment, the sensor panel 500 may be configured to transmit an electromagnetic signal to the electronic pen p or receive an electromagnetic signal from the electronic pen p. For example, a processor (e.g., the processor 120 of FIG. 1) may transmit a first electromagnetic signal to the electronic pen p through the sensor panel 500. The first electromagnetic signal received by the electronic pen p may cause electromagnetic resonance within the electronic pen p. For example, the first electromagnetic signal may cause electromagnetic induction of a coil inside the electronic pen p. A second electromagnetic signal generated by the electromagnetic resonance in the electronic pen p may be transmitted to the sensor panel 500. For example, based on a current in coil in which electromagnetic is induced, the electronic pen p may generate the second electromagnetic signal and transmit the generated second electromagnetic signal to the sensor panel 500. By the electromagnetic induced current, the electronic pen p may generate the second electromagnetic signal without a separate power supply. The second electromagnetic signal received by the sensor panel 500 may cause electromagnetic resonance within the sensor panel 500. The processor 120 may identify an input from the electronic pen p based on a third electromagnetic signal generated by the electromagnetic resonance in the sensor panel 500.

According to an embodiment, the processor 120 may identify a type of the input from the electronic pen p based on identifying a phase of the third electromagnetic signal. For example, the processor 120 may identify the input from the electronic pen p as a touch input, based on identifying that a phase of the third electromagnetic signal is less than or equal to a first threshold value. For another example, the processor 120 may identify the input from the electronic pen p as a hovering input based on identifying that the phase of the third electromagnetic signal is greater than the first threshold value. According to an embodiment, the processor 120 may identify data related to a position of the electronic pen p based on intensity of the third electromagnetic signal. For example, the data related to the position of the electronic pen p may include a coordinate of a portion of display regions 431, 432, and 433 of the display 430 corresponding to the position of the electronic pen p above of the display 430.

According to an embodiment, the sensor panel 500 may be disposed between, directly or indirectly, the display 430 and the first housing 410, and/or between the display 430 and the second housing 420. For example, the sensor panel 500 may be disposed between the display 430 and at least one of the first surface 411 and the third surface 421. According to an embodiment, the sensor panel 500 may be in contact with an adhesive material disposed on at least one of the first surface 411 and the third surface 421. For example, the sensor panel 500 may be in contact with an adhesive material included in a third adhesive member 463 disposed on the first surface 411, and an adhesive material included in a fourth adhesive member 464.

According to an embodiment, the sensor panel 500 may include a first region 501 and a second region 502. The first region 501 may be disposed between the first surface 411 of the first housing 410 and the display 430. The first region 501 may be configured to receive an input of the electronic pen p positioned on a portion of the first display region 431 or the third display region 433. The second region 502 may be disposed between the third surface 421 of the second housing 420 and the display 430. The second region 502 may be configured to receive an input of the electronic pen p positioned on another portion of the second display region 432 or the third display region 433. According to an embodiment, the second region 502 may be spaced apart from the first region 501. As the first region 501 and the second region 502 are spaced apart from each other, an empty space may be formed between the first region 501 and the second region 502. For example, the first area 501 of the sensor panel 500 may be movable by movement of the first housing 410, and the second area 502 of the sensor panel 500 may be movable by movement of the second housing 420. According to an embodiment, a distance between the first region 501 and the second region 502 in the folding state of the electronic device 400 may be greater than a distance between the first region 501 and the second region 502 in the unfolding state of the electronic device 400. For example, in the unfolding state of the electronic device 400, a first side 501a of the first region 501 and a second side 502a of the second region 502 may face each other. In the unfolding state of the electronic device 400, the first side 501a may face the second housing 420. In the unfolding state of the electronic device 400, the second side 502a may face the first housing 410 and may be spaced apart from the first side 501a. The first side 501a may mean one surface of the sensor panel 500 that is substantially parallel to a direction (e.g., +z direction) in which the first surface 411 faces. The second side 502a may mean another surface of the sensor panel 500 parallel to a direction (e.g., +z direction) in which the third surface 421 faces. In the unfolding state of the electronic device 400, the first side 501a and the second side 502a may face in opposite directions from each other. In the folding state of the electronic device 400, the first side 501a and the second side 502a may face substantially the same direction as each other.

According to an embodiment, a portion of the sensor panel 500 may at least partially overlap the hinge structure 450 when the sensor panel 500 is viewed from above (e.g., +z direction). For example, a portion of the first region 501 of the sensor panel 500 may overlap the hinge structure 450 when the sensor panel 500 is viewed from above. For another example, a portion of the second region 502 of the sensor panel 500 may overlap the hinge structure 450 when the sensor panel 500 is viewed from above.

For example, since the first region 501 and the second region 502 of the sensor panel 500 are spaced apart from each other, the sensor panel 500 may be damaged by an impact applied to the electronic device 400. In the folding state of the electronic device 400, the first side 501a of the first region 501 and the second side 502a of the second region 502 may face the hinge structure 450, respectively. The impact applied to the electronic device 400 (e.g., an impact generated by a fall of the electronic device 400) may be transmitted to the first side 501a and the second side 502a of the sensor panel 500. Since the first side 501a and the second side 502a are not supported by other components of the electronic device 400, respectively, the first side 501a and the second side 502a may be deformed by an impact. In case that the first side 501a and the second side 502a are plastically deformed by the impact, the sensor panel 500 may not perform a specified function. Hereinafter, the sensor panel 500 including a structure for reducing damage will be described in detail.

Figure 5:
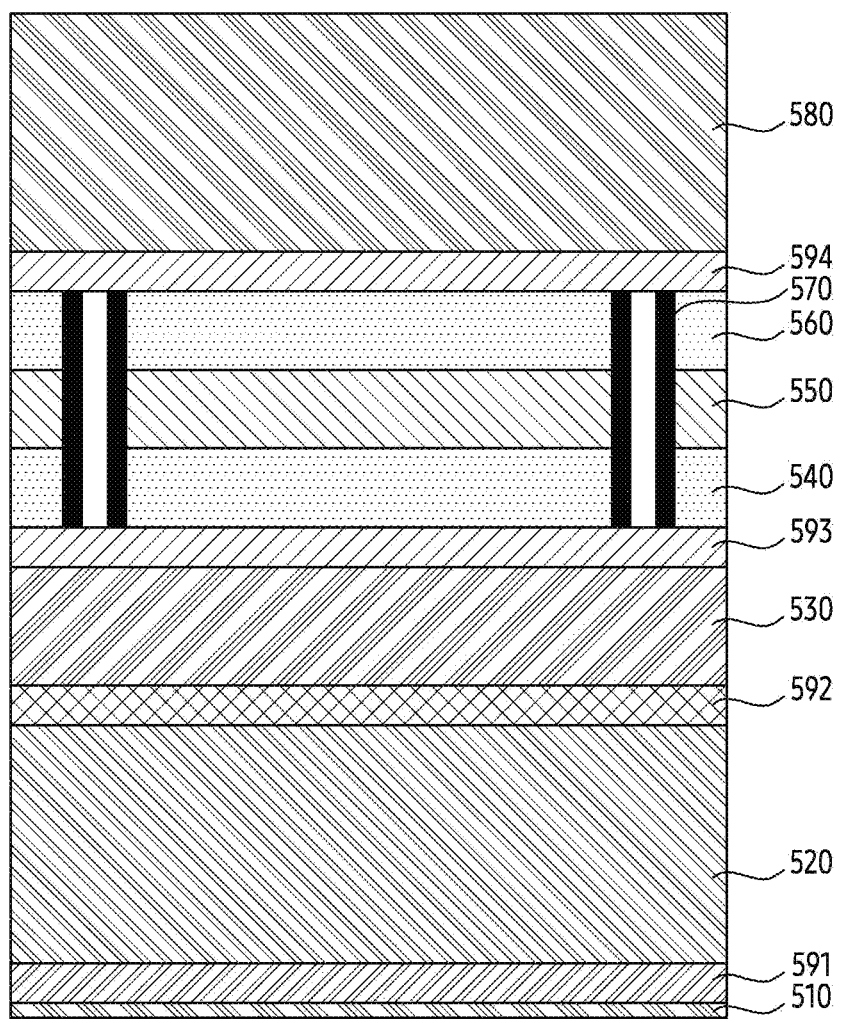
FIG. 5 is a cross-sectional view illustrating a cross-section of a sensor panel of FIG. 4A according to an example embodiment.

FIG. 5 is a cross-sectional view illustrating a cross-section of a sensor panel of FIG. 4A according to an embodiment.

Referring to FIG. 5, a sensor panel 500 according to an embodiment may include a support layer 510, a shielding layer 520, a first insulating layer 530, a first conductive pattern 540, a second insulating layer 550, a second conductive pattern 560, at least one conductive via 570, a third insulating layer 580, and a plurality of adhesive layers 590.

The support layer 510 may support layers included in the sensor panel 500. According to an embodiment, the support layer 510 may be in contact with an adhesive material disposed on at least one of a first surface (e.g., the first surface 411 of FIGS. 4A and 4B) of a first housing (e.g., the first housing 410 of FIGS. 4A and 4B) and a third surface (e.g., the third surface 421 of FIGS. 4A and 4B) of a second housing (e.g., the second housing 420 of FIGS. 4A and 4B). For example, the support layer 510 may be in contact with at least one of a third adhesive member (e.g., the third adhesive member 463 of FIGS. 4A and 4B) and a fourth adhesive member (e.g., the fourth adhesive member 464 of FIGS. 4A and 4B). However, it is not limited thereto. According to embodiments, at least a portion of the support layer 510 may be in contact with at least one of the first surface 411 of the first housing 410 and the third surface 421 of the second housing 420. According to an embodiment, the support layer 510 may define a boundary between the sensor panel 500 and the first housing 410 or a boundary between the sensor panel 500 and the second housing 420. According to an embodiment, the support layer 510 may include a polymer inclusive material. The polymer inclusive material (e.g., polymer material) may be an elastically deformable material. The support layer 510 may have flexibility, by including the polymer material. For example, the polymer material may include polyethylene terephthalate (PET), but it is not limited thereto. According to an embodiment, a thickness of the support layer 510 may be approximately 1 μm to 5 μm. For example, the thickness of the support layer 510 may be approximately 3 μm, but it is not limited thereto.

The shielding layer 520 may shield an electromagnetic wave transmitted to the inside of an electronic device (e.g., the electronic device 400 of FIG. 4A and FIG. 4B). For example, the shielding layer 520 may shield an electromagnetic wave transmitted from an electronic pen (e.g., the electronic pen p of FIG. 4A). For another example, the shielding layer 520 may shield an electromagnetic wave generated from the first conductive pattern 540 and/or the second conductive pattern 560. According to an embodiment, the shielding layer 520 may be disposed on the support layer 510. For example, the shielding layer 520 may include a magnetic metal powder (MMP). The magnetic metal powder may include, for example, iron, aluminum, nickel, silicon, or at least one selected from a combination thereof. According to an embodiment, a thickness of the shielding layer 520 may be approximately 20 μm to 80 μm. For example, the thickness of the shielding layer 520 may be approximately 50 μm, but it is not limited thereto.

The first insulating layer 530 may electrically separate the shielding layer 520 from the first conductive pattern 540. According to an embodiment, the first insulating layer 530 may include an insulating material. For example, the insulating material may include at least one of polyimide (PI) and polyethylene terephthalate, but it is not limited thereto. According to an embodiment, the first insulating layer 530 may be disposed on the shielding layer 520. For example, the first insulating layer 530 may electrically disconnect the shielding layer 520 and the first conductive pattern 540, by being interposed between the shielding layer 520 and the first conductive pattern 540. According to an embodiment, a thickness of the first insulating layer 530 may be approximately 20 μm to 80 μm. For example, the thickness of the first insulating layer 530 may be approximately 25 μm, but it is not limited thereto.

The first conductive pattern 540 may be configured to generate an electromagnetic wave transmitted to the electronic pen p or receive an electromagnetic wave from the electronic pen p. The first conductive pattern 540 may be disposed on the first insulating layer 530. According to an embodiment, the first conductive pattern 540 may form a closed loop and may be disposed in the second insulating layer 550. For example, the first conductive pattern 540 may include at least one of copper, gold, silver, and platinum, but it is not limited thereto. According to an embodiment, a thickness of the first conductive pattern 540 may be approximately 5 μm to 25 μm. For example, the thickness of the first conductive pattern 540 may be approximately 20 μm, but it is not limited thereto.

The second insulating layer 550 may prevent physical contact between the first conductive pattern 540 and the second conductive pattern 560. According to an embodiment, the second insulating layer 550 may be disposed on the first conductive pattern 540. For example, the first conductive pattern 540 may be disposed on a surface of the second insulating layer 550 facing the first insulating layer 530. For another example, the second conductive pattern 560 may be disposed on another surface of the second insulating layer 550 facing the third insulating layer 580. According to an embodiment, the second insulating layer 550 may include an insulating material. For example, the insulating material may include at least one of polyimide (PI) and polyethylene terephthalate, but it is not limited thereto. According to an embodiment, a thickness of the second insulating layer 550 may be approximately 5 μm to 25 μm. For example, the thickness of the second insulating layer 550 may be approximately 12 μm, but it is not limited thereto.

The second conductive pattern 560 may be configured to generate an electromagnetic wave transmitted to the electronic pen p or receive an electromagnetic wave from the electronic pen p. The second conductive pattern 560 may be disposed on the second insulating layer 550. According to an embodiment, the second conductive pattern 560 may form a closed loop and may be disposed on the second insulating layer 550. For example, the second conductive pattern 560 may include at least one of copper, gold, silver, and platinum, but it is not limited thereto. According to an embodiment, a thickness of the second conductive pattern 560 may be substantially the same as the thickness of the first conductive pattern 540. According to an embodiment, the thickness of the second conductive pattern 560 may be approximately 5 μm to 25 μm. For example, the thickness of the second conductive pattern 560 may be approximately 20 μm, but it is not limited thereto.

According to an embodiment, the sensor panel 500 may be configured to obtain an induced current flowing in the first conductive pattern 540 or the second conductive pattern 560 through an electromagnetic interaction with the electronic pen p. For example, a processor (e.g., the processor 120 of FIG. 1) may apply current to the first conductive pattern 540 and/or the second conductive pattern 560. The current flowing in the first conductive pattern 540 and/or the second conductive pattern 560 may generate a first electromagnetic signal transmitted to the electronic pen p. The first electromagnetic signal transmitted to the electronic pen p may cause resonance in the electronic pen p, and the caused resonance may generate a second electromagnetic signal. The second electromagnetic signal generated in the electronic pen p may cause electromagnetic resonance in the first conductive pattern 540 and/or the second conductive pattern 560. The first conductive pattern 540 and/or the second conductive pattern 560 may generate a third electromagnetic signal through the electromagnetic resonance by the second electromagnetic signal. For example, the second electromagnetic signal may generate an induced current in the first conductive pattern 540 and/or the second conductive pattern 560. The current induced in the first conductive pattern 540 and/or the second conductive pattern 560 may correspond to the third electromagnetic signal. The processor 120 may identify an input from the electronic pen p based on the third electromagnetic signal corresponding to the current induced in the first conductive pattern 540 and/or the second conductive pattern 560.

At least one conductive via 570 may electrically connect the first conductive pattern 540 and the second conductive pattern 560. According to an embodiment, at least one conductive via 570 may penetrate the first conductive pattern 540, the second insulating layer 550, and the second conductive pattern 560. For example, at least one conductive via 570 may be formed by applying a conductive material to an inner surface of a hole penetrating the first conductive pattern 540, the second insulating layer 550, and the second conductive pattern 560.

The third insulating layer 580 may protect layers included in the sensor panel 500. According to an embodiment, the third insulating layer 580 may be referred to as a coverlay. The third insulating layer 580 may be disposed on the second conductive pattern 560 and may face a surface of a display (e.g., the display 430 of FIGS. 4A and 4B). For example, the third insulating layer 580 may define a boundary between the sensor panel 500 and the display 430. According to an embodiment, the third insulating layer 580 may include an insulating material. For example, the insulating material may include at least one of polyimide (PI) and polyethylene terephthalate, but it is not limited thereto. According to an embodiment, a thickness of the third insulating layer 580 may be approximately 30 μm to 100 μm. For example, the thickness of the third insulating layer 580 may be approximately 50 μm, but it is not limited thereto.

The plurality of adhesive layers 590 may couple layers of sensor panel 500 with each other. For example, each of the plurality of adhesive layers 590 may include an adhesive material. According to an embodiment, the plurality of adhesive layers 590 may include a first adhesive layer 591, a second adhesive layer 592, a third adhesive layer 593, and/or a fourth adhesive layer 594. The first adhesive layer 591 may be interposed between the support layer 510 and the shielding layer 520. The second adhesive layer 592 may be interposed between the shielding layer 520 and the first insulating layer 530. The third adhesive layer 593 may be interposed between the first insulating layer 530 and the first conductive pattern 540. The fourth adhesive layer 594 may be interposed between the second conductive pattern 560 and the third insulating layer 580. According to an embodiment, a thickness of each of the plurality of adhesive layers 590 may be approximately 1 μm to approximately 25 μm. For example, a thickness of the first adhesive layer 591 may be approximately 3 μm or 8 μm, a thickness of the second adhesive layer 592 may be approximately 8 μm, a thickness of the third layer 593 may be approximately 15 μm, and a thickness of the fourth layer 594 may be approximately 15 μm, but it is not limited thereto.

According to an embodiment, the support layer 510 may be elastically deformed by an impact applied from the outside of the electronic device 400, by having flexibility by the polymer material. An elastic deformation may mean that the support layer 510 is restored to its original shape after receiving a force for deforming the support layer 510 into a specific shape. The support layer 510 including the polymer material may reduce damage to the sensor panel 500. For example, in case that the support layer 510 is made of metal, the support layer 510 made of metal (e.g., Stainless steel) may be more likely to be plastically deformed by an impact applied from the outside of the electronic device 400 than the support layer 510 made of the polymer material. The plastic deformation may mean that the support layer 510 cannot be restored to its original shape after receiving a force of deforming the support layer 510 into a specific shape. As the support layer 510 is plastically deformed, damage to the sensor panel 500 may occur. The electronic device 400 according to an embodiment may provide a structure that is robust to the impact applied from the outside of the electronic device 400 by the support layer 510 including the polymer material.

According to an embodiment, a thickness of at least one of the first insulating layer 530 and the third insulating layer 580 may be greater than a thickness of the second insulating layer 550. For example, in case that a metal material is excluded from the support layer 510, a rigidity of the sensor panel 500 may be reinforced by an increase of a thickness of layers included in the sensor panel 500. In case that the rigidity of the sensor panel 500 is reinforced by an increase of the thickness of the second insulating layer 550, the performance of the sensor panel 500 may be deteriorated, as a distance between the first conductive pattern 540 and the second conductive pattern 560 increases. In order to prevent the performance degradation of the sensor panel 500, the rigidity of the sensor panel 500 may be reinforced through an increase of a thickness of the first insulating layer 530 and the third insulating layer 580. As the thickness of the first insulating layer 530 and the third insulating layer 580 increases, the thickness of at least one of the first insulating layer 530 and the third insulating layer 580 may be greater than the thickness of the second insulating layer 550.

According to an embodiment, a thickness of layers of the sensor panel 500 may be set such that a neutral plane of the sensor panel 500 is positioned in the second insulating layer 550. For example, the neutral surface of the sensor panel 500 may be positioned at a center of the second insulating layer 550. When the sensor panel 500 is deformed, the neutral plane of the sensor panel 500 may mean a boundary between a portion of the sensor panel 500 where a compressive force is applied and another portion of the sensor panel 500 where a tensile force is applied. For example, in case that the neutral plane of the sensor panel 500 is not located in the second insulating layer 550, magnitude of applied stress increases as being far away from the neutral plane of the sensor panel 500, and thus a possibility of damage to one of the first conductive pattern 540 or the second conductive pattern 560 may increase. The electronic device 400 according to an embodiment may provide a structure that disperses stress applied to the first conductive pattern 540 or the second conductive pattern 560 by the sensor panel 500 in which the neutral plane is for example defined in the second insulating layer 550.

According to an embodiment, a thickness of the third insulating layer 580 may be greater than a thickness of the first insulating layer 530. For example, the number of layers disposed between the second insulating layer 550 and the third insulating layer 580 may be greater than the number of layers disposed between the second insulating layer 550 and the support layer 510. For example, a sum of a thicknesses of the layers disposed between the second insulating layer 550 and the support layer 510 may be greater than a sum of a thicknesses of the layers disposed between the second insulating layer 550 and the third insulating layer 580. The thickness of the third insulating layer 580 may be greater than the thickness of the first insulating layer 530 so that a neutral surface is for example defined in the second insulating layer 550.

As described above, the electronic device 400 according to an embodiment may provide a structure capable of preventing damage to the sensor panel 500 by the support layer 510 which may include the polymer material. The electronic device 400 according to an embodiment may provide a structure capable of preventing damage to the sensor panel 500 by the first insulating layer 530 or the third insulating layer 580 having the thickness greater than the thickness of the second insulating layer 550.

According to an embodiment, an electronic device (e.g., the electronic device 400 of FIGS. 4A and 4B) may comprise a first housing (e.g., the first housing 410 of FIGS. 4A and 4B) which may include a first surface (e.g., the first surface 411 of FIGS. 4A and 4B) and a second surface (e.g., the second housing 420 of FIGS. 4A and 4B) spaced from the first surface and facing the first surface, and a second housing (e.g., the second housing 420 of FIGS. 4A and 4B) which may include a third surface (e.g., the third surface 421 of FIGS. 4A and 4B) and a fourth surface (e.g., the fourth surface 322 of FIGS. 3A and 3B) spaced the third surface and facing the third surface. According to an embodiment, the electronic device may comprise a hinge structure (e.g., the hinge structure 450 of FIGS. 4A and 4B) capable of being switched to an unfolding state in which a direction in which the first surface faces and a direction in which the third surface faces are distinct from each other, or a folding state in which a direction in which the first surface faces and a direction in which the third surface faces are opposite, by rotatably coupling a side of the first housing and a side of the second housing. According to an embodiment, the electronic device may comprise the hinge structure, a display (e.g., the display 430 of FIGS. 4A and 4B) disposed above the first surface and the third surface, and a sensor panel (e.g., the sensor panel 500 of FIGS. 4A and 4B) disposed between at least one of the first surface and the third surface and the display, and configured to receive an input from an electronic pen. According to an embodiment, the sensor panel may include a supporting layer (e.g., the supporting layer 510 of FIG. 5), which may include a polymer material, and being in contact with an adhesive material disposed on at least one of the first surface and the third surface. According to an embodiment, the sensor panel may include a shielding layer (e.g., the shielding layer 520 of FIG. 5) disposed on the supporting layer, a first insulating layer (e.g., the first insulating layer 530 of FIG. 5) disposed on the shielding layer, a first conductive pattern (e.g., the first conductive pattern 540 of FIG. 5) disposed on the first insulating layer, a second insulating layer (e.g., the second insulating layer 550 of FIG. 5) disposed on the first conductive layer, a second conductive pattern (e.g., the second conductive pattern 560 of FIG. 5) disposed on the second insulating layer, and a third insulating layer (e.g., the third insulating layer 580 of FIG. 5), disposed on the second conductive pattern, and facing a surface of the display. According to an embodiment, a thickness of at least one of the first insulating layer and the third insulating layer may be greater than a thickness of the second insulating layer.

According to an embodiment, a thickness of the first insulating layer may be smaller than a thickness of the third insulating layer.

According to an embodiment, the polymer material includes polyethylene terephthalate (PET).

According to an embodiment, the sensor panel may further include a conductive via (e.g., the conductive via 570 of FIG. 5) extending from the first conductive pattern to the second conductive pattern and electrically coupling the first conductive pattern and the second conductive pattern.

According to an embodiment, the sensor panel may be configured to obtain, through electromagnetic interaction with the electronic pen, an induced current flowing in the first conductive pattern or the second conductive pattern.

According to an embodiment, the sensor panel may further include a first region (e.g., the first region 501 of FIGS. 4A and 4B) disposed between the first surface and the display. According to an embodiment, the sensor panel may further include a second region (e.g., the second region 502 of FIGS. 4A and 4B), spaced from the first region, and disposed between the third surface and the display.

According to an embodiment, at least one of the first insulating layer, the second insulating layer, and the third insulating layer may include polyethylene terephthalate (PET) or polyimide (PI).

According to an embodiment, at least one of the first conductive pattern and the second conductive pattern may include at least one of copper, gold, silver, and platinum.

According to an embodiment, the shielding layer may include a magnetic metal powder (MMP).

According to an embodiment, a portion of the sensor panel may overlap the hinge structure when the sensor panel is viewed from above.

According to an embodiment, the sensor panel may further include a first adhesive layer (e.g., the first adhesive layer 591 of FIG. 5) interposed between the supporting layer and the shielding layer.

According to an embodiment, the sensor panel may further include a second adhesive layer (e.g., the second adhesive layer 592 of FIG. 5) interposed between the shielding layer and the second insulating layer.

According to an embodiment, the sensor panel may further include a third adhesive layer (e.g., the third adhesive layer 593 of FIG. 5) interposed between the first conductive pattern and the second insulating layer.

According to an embodiment, the sensor panel may further include a fourth adhesive layer (e.g., the fourth adhesive layer 594 of FIG. 5) interposed between the second conductive pattern and the third insulating layer.

According to an embodiment, an electronic device (e.g., the electronic device 400 of FIGS. 4A and 4B) may comprise a first housing (e.g., the first housing 410 of FIGS. 4A and 4B) including a first surface (e.g., the first surface 411 of FIGS. 4A and 4B) and a second surface (e.g., the second surface 312 of FIGS. 3A and 3B) opposite to the first surface and a second housing (e.g., the second housing 420 of FIGS. 4A and 4B) including a third surface (e.g., the third surface 421 of FIGS. 4A and 4B) and a fourth surface (e.g., the fourth surface 322 of FIGS. 3A and 3B) opposite to the third surface. According to an embodiment, the electronic device may comprise a hinge structure (e.g., the hinge structure 450 of FIGS. 4A and 4B) capable of being switched to an unfolding state in which a direction in which the first surface faces and a direction in which the third surface faces are the same, or a folding state in which the first surface and the third surface face each other, by rotatably coupling the first housing and the second housing. According to an embodiment, the electronic device may comprise a display (e.g., the display 430 of FIGS. 4A and 4B) disposed above the first surface and the third surface across the hinge structure. According to an embodiment, the electronic device may comprise a sensor panel (e.g., the sensor panel 500 of FIGS. 4A and 4B) that includes a first region (e.g., the first region 501 of FIGS. 4A and 4B) disposed between the first surface and the display and a second region (e.g., the second region 502 of FIGS. 4A and 4B), spaced from the first region, and disposed between the third surface and the display, and is configured to receive an input from an electronic pen. According to an embodiment, the sensor panel may include a supporting layer (e.g., the support layer 510 of FIG. 5), including a polymer material, and being in contact with an adhesive material disposed on at least one of the first surface and the third surface. According to an embodiment, the sensor panel may include a shielding layer (e.g., the shielding layer 520 of FIG. 5) disposed on the supporting layer, a first insulating layer (e.g., the first insulating layer 530 of FIG. 5) disposed on the shielding layer, a first conductive pattern (e.g., the first conductive pattern 540 of FIG. 5) disposed on the first insulating layer, a second insulating layer (e.g., the second insulating layer 550 of FIG. 5) disposed on the first conductive layer, a second conductive pattern (e.g., the second conductive pattern 560 of FIG. 5) disposed on the second insulating layer, and a third insulating layer (e.g., the third insulating layer 580 of FIG. 5), disposed on the second conductive pattern, and facing a surface of the display. According to an embodiment, a thickness of at least one of the first insulating layer and the third insulating layer may be greater than a thickness of the second insulating layer. "Disposed on" as used herein covers both disposed directly on and disposed indirectly on.

According to an embodiment, a thickness of the third insulating layer may be greater than a thickness of the first insulating layer.

According to an embodiment, the polymer material may include polyethylene terephthalate (PET).

According to an embodiment, at least one of the first insulating layer, the second insulating layer, and the third insulating layer may include polyethylene terephthalate (PET) or polyimide (PI).

According to an embodiment, the sensor panel may further include a conductive via (e.g., the conductive via 570 of FIG. 5) penetrating the first conductive pattern, the second insulating layer, and the second conductive pattern.

According to an embodiment, the sensor panel may be configured to obtain, through electromagnetic interaction with the electronic pen, an induced current flowing in the first conductive pattern or the second conductive pattern.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Each "processor" herein includes processing circuitry, and/or may include multiple processors. For example, as used herein, including the claims, the term "processor" may include various processing circuitry, including at least one processor, wherein one or more of at least one processor, individually and/or collectively in a distributed manner, may be configured to perform various functions described herein.

As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

No claim element is to be construed under the provisions of 35 U.S.C. § 112, sixth paragraph, unless the element is expressly recited using the phrase "means for" or "means".

What is claimed is:

1. An electronic device comprising:
a first housing including a first surface and a second surface opposite to the first surface;
a second housing including a third surface and a fourth surface opposite to the third surface;
a hinge structure, comprising a hinge, capable of being switched between at least an unfolding state in which a direction in which the first surface faces and a direction in which the third surface faces are the same, and a folding state in which the first surface and the third surface face each other, by rotatably coupling the first housing and the second housing;
a display disposed above at least the first surface and the third surface across the hinge structure; and
a sensor panel, disposed between at least one of the first surface and the third surface, and the display, and configured to receive an input from an electronic pen, and wherein the sensor panel includes:
a supporting layer, including a polymer inclusive material, and being in contact with an adhesive material disposed on at least one of the first surface and the third surface;
a shielding layer disposed on the supporting layer;
a first insulating layer disposed on the shielding layer;
a first conductive pattern disposed on the first insulating layer;
a second insulating layer disposed on the first conductive layer;
a second conductive pattern disposed on the second insulating layer; and
a third insulating layer, disposed on the second conductive pattern, and facing a surface of the display, and wherein a thickness of at least one of the first insulating layer and the third insulating layer is greater than a thickness of the second insulating layer.

2. The electronic device of claim 1,
wherein a thickness of the third insulating layer is greater than a thickness of the first insulating layer.

3. The electronic device of claim 1,
wherein the polymer inclusive material includes polyethylene terephthalate (PET).

4. The electronic device of claim 1,
wherein the sensor panel further includes a conductive via penetrating the first conductive pattern, the second insulating layer, and the second conductive pattern.

5. The electronic device of claim 1,
wherein the sensor panel is configured to obtain, through electromagnetic interaction with the electronic pen, an induced current flowing in the first conductive pattern or the second conductive pattern.

6. The electronic device of claim 1,
wherein the sensor panel further includes:
a first region disposed between at least the first surface and the display; and
a second region, spaced from the first region, and disposed between at least the third surface and the display.

7. The electronic device of claim 6, wherein:
in the unfolding state, a direction in which a first side of the first region faces is opposite to a direction in which a second side of the second region faces; and
in the folding state, the direction in which the first side of the first region faces is the same as the direction in which the second side of the second region faces.

8. The electronic device of claim 1,
wherein at least one of the first insulating layer, the second insulating layer, and the third insulating layer includes at least one of polyethylene terephthalate (PET) and polyimide (PI).

9. The electronic device of claim 1,
wherein at least one of the first conductive pattern and the second conductive pattern includes at least one of copper, gold, silver, and platinum.

10. The electronic device of claim 1,
wherein the shielding layer includes a magnetic metal powder (MMP).

11. The electronic device of claim 1,
wherein a portion of the sensor panel overlaps the hinge structure when the sensor panel is viewed from above.

12. The electronic device of claim 1,
wherein the sensor panel further includes a first adhesive layer interposed between at least the supporting layer and the shielding layer.

13. The electronic device of claim 1,
wherein the sensor panel further includes a second adhesive layer interposed between at least the shielding layer and the second insulating layer.

14. The electronic device of claim 1,
wherein the sensor panel further includes a third adhesive layer interposed between at least the first conductive pattern and the second insulating layer.

15. The electronic device of claim 1,
wherein the sensor panel further includes a fourth adhesive layer interposed between at least the second conductive pattern and the third insulating layer.

16. An electronic device comprising:
a first housing including a first surface and a second surface opposite to the first surface;
a second housing including a third surface and a fourth surface opposite to the third surface;
a hinge structure, comprising a hinge, configured to be switched between at least an unfolding state in which a direction in which the first surface faces and a direction in which the third surface faces are the same, and a folding state in which the first surface and the third surface face each other, by rotatably coupling the first housing and the second housing;
a display disposed above the first surface and the third surface across the hinge structure; and
a sensor panel that includes a first region disposed between at least the first surface and the display and a second region, spaced from the first region, and disposed between at least the third surface and the display, and is configured to receive an input from an electronic pen, and
wherein the sensor panel includes:
a supporting layer, including a polymer inclusive material, and being in contact with an adhesive material disposed on the first surface and the third surface;
a shielding layer disposed on the supporting layer;
a first insulating layer disposed on the shielding layer;
a first conductive pattern disposed on the first insulating layer;
a second insulating layer disposed on the first conductive layer;
a second conductive pattern disposed on the second insulating layer; and
a third insulating layer, disposed on the second conductive pattern, and facing a surface of the display, and
wherein thicknesses of the first insulating layer and the third insulating layer are greater than a thickness of the second insulating layer.

17. The electronic device of claim 16,
wherein the thickness of the third insulating layer is greater than the thickness of the first insulating layer.

18. The electronic device of claim 16,
wherein the polymer inclusive material includes polyethylene terephthalate (PET).

19. The electronic device of claim 16,
wherein at least one of the first insulating layer, the second insulating layer, and the third insulating layer includes at least one of polyethylene terephthalate (PET) and polyimide (PI).

20. The electronic device of claim 16,
further comprising a conductive via penetrating the first conductive pattern, the second insulating layer, and the second conductive pattern.

* * * * *